United States Patent [19]

Hart

[11] 4,237,197

[45] Dec. 2, 1980

[54] ELECTROCHEMICAL SYSTEM

[75] Inventor: Thomas G. Hart, Royal Oak, Mich.

[73] Assignee: Energy Development Associates, Inc., Madison Heights, Mich.

[21] Appl. No.: 892,691

[22] Filed: Apr. 3, 1978

Related U.S. Application Data

[63] Continuation-in-part of Ser. No. 744,712, Nov. 24, 1976, Pat. No. 4,096,393.

[51] Int. Cl.³ .......................................... H01M 2/38
[52] U.S. Cl. ..................................... 429/81; 429/229; 429/199
[58] Field of Search ................. 429/51, 199, 116, 118, 429/110, 71, 72, 80, 81, 229

[56] References Cited

U.S. PATENT DOCUMENTS

| 3,083,253 | 3/1963 | Sundberg | 429/51 |
| 3,674,566 | 7/1972 | Powers | 429/116 |
| 3,713,888 | 1/1973 | Symons | 429/51 |
| 3,861,957 | 1/1975 | Huhta-Koivisto | 429/51 X |
| 3,930,885 | 1/1976 | Dey | 429/116 |
| 4,048,396 | 9/1977 | Hollander, Jr. | 429/116 |
| 4,152,492 | 5/1979 | McCartney | 429/116 |

Primary Examiner—Charles F. Lefevour

[57] ABSTRACT

An electrochemical system comprising a housing containing at least two electrodes, a reservoir having flexible walls, conduit means connecting said housing and said reservoir, and means to circulate electrolyte between said housing and said reservoir is disclosed.

10 Claims, 2 Drawing Figures

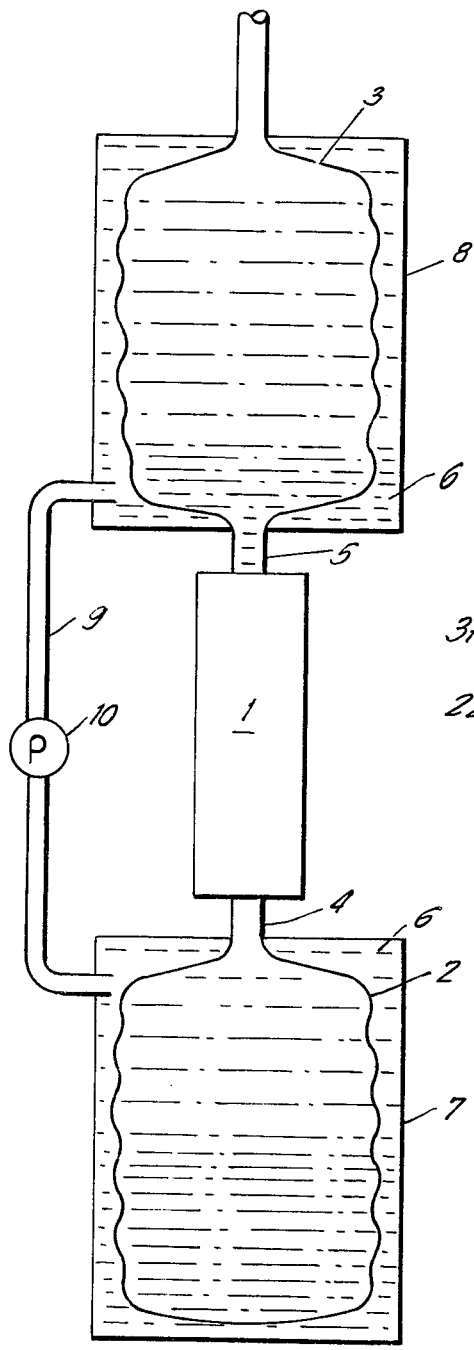
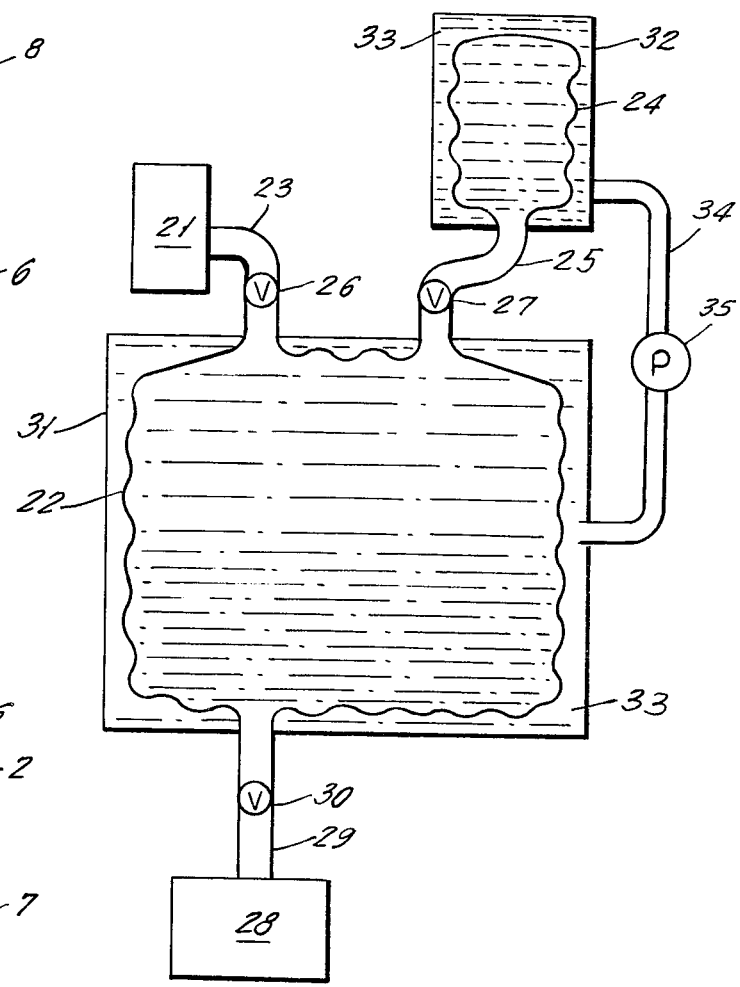

ELECTROCHEMICAL SYSTEM

This is a continuation-in-part of application Ser. No. 744,712 filed Nov. 24, 1976, now U.S. Pat. No. 4,096,393.

BACKGROUND OF THE INVENTION

In all of the known practical electrochemical systems involving halogen, elemental halogen is produced or utilized somewhere in the system. This is true for both the reversible electrochemical systems such as the zinc/chlorine battery, and for non-reversible systems such as the sodium chloride chlorine-manufacturing cell.

In the zinc/chlorine battery described, e.g., U.S. Pat. No. 3,713,888, as the battery is charged, the chlorine emerges from the cell as chlorine gas which is then dissolved in water or electrolyte and the latter is then cooled to form chlorine hydrate, in which form the chlorine is stored until the battery is discharged. When the battery is discharged, the chlorine hydrate is decomposed into chlorine gas and water, and the chlorine gas is then dissolved in the cell electrolyte in order to sustain the discharge.

In the sodium chloride chlorine manufacturing process, chlorine gas formed is transferred out of the cell, dried and mechanically compressed and cooled into liquid form for storage and disposal.

The necessity of handling elemental halogen, which is corrosive and toxic, increases the safety hazards inherent in the system, requires the use of high cost corrosion-resistant materials, and reduces the efficiency of the system. It has now been found that the safety, reliability, and efficiency of the system can be increased while at the same time the need for high cost construction materials can be reduced by employing reservoirs with flexible walls. Accordingly, it is the object of this invention to provide a new electrochemical system in which halogen is produced or utilized having increased safety, reliability and efficiency and reduced need of high cost construction materials.

This and other objects of the invention will become apparent to those skilled in the art from the following detailed disclosure in which FIG. 1 is a schematic diagram of a first embodiment of the invention employing two reservoirs and FIG. 2 is a schematic drawing of a second embodiment of the invention employing a single reservoir.

SUMMARY OF THE INVENTION

This invention relates to an electrochemical system employing halogen of increased safety, reliability and efficiency and decreased need for high cost construction materials. More particularly, the invention relates to an electrochemical system in which the reservoirs have flexible walls.

DESCRIPTION OF THE INVENTION

The embodiment of this invention shown in FIG. 1 has particular utility in a reversible system where there is alternating circulation, i.e., where the direction of circulation flow is reversed. An example of such a system is shown in the aforementioned Symons U.S. Pat. No. 3,713,888, the disclosure of which is hereby incorporated by reference. An electrochemical cell 1 is provided and contains at least two electrodes (not shown). A first reservoir 2 and a second reservoir 3 are connected to cell 1 at different points through conduits 4 and 5, respectively. Reservoirs 2 and 3 contain electrolyte and/or halogen. In this embodiment alteration of the circulation is accomplished by alternately increasing and decreasing the pressure outside the two electrolytic reservoirs 2 and 3 so that the pressure outside one reservoir is low while the pressure outside the other reservoir is high. The alternating pressure drives electrolyte backwards and forward from one reservoir to the other and hence backwards and forward through cell 1. Reservoirs 2 and 3 are made of flexible material and pressure is transferred to the flexible reservoirs by water 6 contained between the reservoirs and substantially in flexible containers 7 and 8 which envelope reservoirs 2 and 3, respectively. The volume of water 6 is relatively small and only a small fraction of this volume is pumped between reservoirs 2 and 3 through a conduit 9 containing a conventional water pump 10.

The pressure differential between the inside and outside of flexible reservoirs 2 and 3 is merely a few grams per square centimeter generated by water pump 10 and, therefore, relatively weak materials and adequate for construction of reservoirs 2 and 3. For example, teflon coated fiber glass cloth, which can withstand all halogen cell corrosive actions even at elevated temperature is suitable. Outer containers 7 and 8 must be suitable for the full system pressure, which can be as high as about 150 psig, but are separated from the corrosive elements within reservoirs 2 and 3 by the water 6 and the flexible material. Therefore, containers 7 and 8 are chosen of a material based on low cost and high strength and can be, for example, steel. The water 6 is continually monitored to determine whether there is a halogen or other chemical level sufficient to cause a corrosive condition dangerous to the container material. A small amount of leakage requires only periodic replacement of water 6. It is preferred to alternate circulation of water 6 by operating pump 10 sinusoidally.

In a typical zinc/chlorine system, for example, the optimum electrolyte amount transferred each cycle during charge is about 10 times the volume of cell 1, which is typically about 1% of the halogen reservoir volume. Generally, the cycle rate during charge is three cycles per minute. In most systems, the halogen as a liquid or hydrate is denser than the electrolyte and settles to the bottom, and is stored in, the lower part of reservoir 2.

An important advantage of the embodiment shown in FIG. 1 is that there is limited heat transfer from cell 1 to reservoirs 2 and 3 which allows optimizing efficient halogen transfer to and from the cell during charge and discharge independently of heat transfer requirements, and thereby leading to a more energy efficient system. Another important advantage is that turbulence can be very well promoted and maintained by the alternating circulation.

The embodiment employing a single reservoir is illustrated in FIG. 2. In this embodiment, for example, a reservoir for water 21 is connected to main electrolyte reservoir 22 through a conduit 23. Additionally, a reservoir for, e.g., chlorine 24 is connected to main electrolyte reservoir 22 through a conduit 25. Valves 26 and 27 are provided in conduits 23 and 25, respectively, for isolating reservoirs 21 and 24 from the reservoir 22. In reservoir 22, the water and chlorine mix to form an aqueous hydrochloric acid electrolyte. Electrolyte reservoir 22 is connected to a cell 28 containing at least two electrodes by a conduit 29 containing a valve 30 for isolation purposes.

In a manner similar to the embodiment shown in FIG. 1, the reservoirs 22 and 24 of FIG. 2 are constructed of a flexible material surrounded by outer strong and corrosive resistance containers 31 and 32. Pressure is transferred to the flexible reservoirs by water 33 contained between reservoirs 22 and 24 and their respective containers 31 and 32, respectively. The volume of water 33 is relatively small and only a small fraction of this volume is pumped between reservoirs 22 and 24 through a conduit 34 containing a conventional water pump 35.

The system illustrated in FIG. 2 can be operated as follows. In order to prepare the aqueous hydrochloric acid electrolyte, valve 30 is closed isolating electrolyte reservoir 22 from cell 28. Valves 26 and 27 are opened to permit introduction of water and chlorine into reservoir 22. The transfer of chlorine from reservoir 24 to reservoir 22 is assisted by operating pump 35 so as to increase the pressure against reservoir 24 and decrease the pressure against reservoir 22. Thereafter, valves 26 and 27 are closed, valve 30 is opened, and the movement of hydrochloric acid electrolyte from reservoir 22 into cell 28 is assisted by reversing the operation of pump 35 so as to increase the pressure against the flexible walls of reservoir 22.

Various changes and modifications can be made in the process and apparatus of this invention without departing from the spirit and scope thereof. The various embodiments disclosed herein were for the purpose of further illustrating the invention but were not intended to limit it.

I claim:

1. A zinc halogen electrochemical system comprising a housing containing at least two electrodes, two electrolyte reservoirs, a first reservoir having flexible walls, conduit means connecting said housing and said reservoir, means to vary the pressure on the outside of said flexible walls of said first electrolyte reservoir relative to the pressure on the outside of flexible walls of the second electrolyte reservoir, and means to circulate electrolyte through the electrode area and between said housing and said first reservoir.

2. The electrochemical system of claim 1 wherein said means to circulate electrolyte comprises means to vary the pressure on the outside of the flexible walls of said first reservoir.

3. The electrochemical system of claim 2 wherein said first reservoir is surrounded by a casing and a hydraulic fluid between said casing and said flexible walls of said first reservoir.

4. The electrochemical system of claim 1 further comprising a second reservoir having flexible walls and second conduit means connecting said second reservoir with said housing and wherein said means to circulate electrolyte between said housing and said first reservoir comprises means to circulate electrolyte between said first and second reservoirs and through said housing.

5. The electrochemical system of claim 4 wherein said means to circulate electrolyte comprises means to vary the pressure on the outside of the flexible walls of said first reservoir relative to the pressure on the outside of the flexible walls of the second reservoir.

6. The electrochemical system of claim 5 further comprising a first casing surrounding said flexible walls of said first reservoir, a first hydraulic fluid between said first casing and said flexible walls of said first reservoir, a second casing surrounding the flexible walls of said second reservoir, a second hydraulic fluid between said second casing and said flexible walls of said second reservoir, and means to vary the pressure of said first and second hydraulic fluids relative to one another.

7. The electrochemical system of claim 6, wherein said first hydraulic fluid is water.

8. The electrochemical system of claim 1 wherein said first reservoir is for containing at least one of an electrolyte and a halogen.

9. A zinc halogen electrochemical system comprising: a housing containing at least two electrodes: a first electrolyte reservoir having flexible walls for mixing an electrolyte with another substance; first conduit means connecting said housing and said first reservoir; a second electrolyte reservoir having flexible walls; means for varying the pressure on the outside of the flexible walls of the first electrolyte reservoir relative to the pressure on the outside of the flexible walls of the second electrolyte reservoir; and means for introducing a selected amount of a substance of said second reservoir into said first reservoir including the circulation of the electrolyte through the electrode area.

10. The electrochemical system of claim 9 wherein said introducing means further comprises: a second conduit; valve means for selectively opening and closing said second conduit; a casing enclosing said second reservoir; and a hydraulic fluid disposed between said casing and said second reservoir.

* * * * *